(12) United States Patent
Foltuz et al.

(10) Patent No.: US 6,196,830 B1
(45) Date of Patent: Mar. 6, 2001

(54) WATER JACKET APPARATUS FOR INJECTION MOLDING SYSTEMS

(75) Inventors: Eugene L. Foltuz; Norman H. Cohan; Enidio A. Gomez, all of Miami Lakes, FL (US)

(73) Assignee: Security Plastics, Inc., Miami, FL (US)

( * ) Notice: Subject to any disclaimer, the term of this patent is extended or adjusted under 35 U.S.C. 154(b) by 0 days.

(21) Appl. No.: 09/224,263

(22) Filed: Dec. 31, 1998

(51) Int. Cl.$^7$ ..................................................... B29C 45/73
(52) U.S. Cl. ........................................ 425/552; 264/328.14
(58) Field of Search ............................ 425/552, 547, 425/548; 264/328.14

(56) References Cited

U.S. PATENT DOCUMENTS

| | | |
|---|---|---|
| 4,622,001 * | 11/1986 | Bright et al. .......................... 425/552 |
| 4,828,479 | 5/1989 | Pleasant . |
| 5,423,670 * | 6/1995 | Hamel .................................... 425/552 |
| 5,647,114 | 7/1997 | Pleasant . |
| 5,935,621 * | 8/1999 | Gellert et al. ......................... 425/552 |

* cited by examiner

*Primary Examiner*—Tim Heitbrink
(74) *Attorney, Agent, or Firm*—Lott & Friedland, P.A.

(57) ABSTRACT

A water jacket assembly for use in injection mold systems, and particularly with heterocavity injection mold systems. The water jacket assembly comprises a sleeve construction of material with high heat-transfer properties. A conduit is beveled into the outside perimeter of the sleeve forming a circulation channel. The inside perimeter of the sleeve is fashioned to receive an individual injection mold. A mold base slideably received the water jacket and cooling fluid is circulated from the mold base through circulation channel in the water jacket, and then back to the mold base. A fluid input plug and fluid output plug extend from the mold base and are received by the apertures in the individual mold for additional cooling.

6 Claims, 1 Drawing Sheet

WATER JACKET APPARATUS FOR INJECTION MOLDING SYSTEMS

FIELD OF INVENTION

The present invention relates generally to a water jacket for injection molding apparatus, and more specifically, for heterocavity injection molding machines.

BACKGROUND OF THE INVENTION

In the field of thermoplastic injection molding, thermal regulation is critical for efficient production. Typically, plastic resin must be heated to a temperature where it flows freely as a liquid. The liquid plastic is then injected into a pre-shaped mold. When the mold is cooled, the plastic solidifies in the shape of the mold and the part is ejected. Thermoplastic materials have the tendency to stick to hot surfaces in the mold. Good thermal regulation reduces cycle times, prevent sticking, and aids in part ejection. Water is most commonly used to cool or heat the mold apparatus, although other fluids may be utilized.

An object of this invention is to provide a thermal regulating mechanism for injection molds, particularly heterocavity systems. A heterocavity injection mold machine has the ability to utilize a variety of different molds during operation. This permits operators to efficiently produce output for a plurality of clients. In addition, the heterocavity system allows the owners of different molds to share in the costs of the production run. Heterocavity systems provide significant cost and production benefits to the injection mold business. However, in heterocavity systems it is often necessary to change one or more molds used in the machine between runs. By minimizing the time consumed during these changeover periods, greater overall efficiency can be achieved.

A further object of this invention is to provide a quick-change feature for heterocavity mold system which utilize a variety of locking-key mechanisms to secure each individual mold within the mold base. In certain locking-key arrangements, even though only one mold may require changing before a production run, every mold is unlocked in the process. Although the other molds may stay in place within the mold base, they are not sufficiently secured to prevent leakage of the cooling fluid that circulates throughout the mold apparatus. Furthermore, new locking mechanisms may rely on the actual compression of the "A" and "B" plates during the molding process to form a tight fluid seal. However, while the "A" and "B" plates are separated, the individual molds are not completely rigid within the mold base, thereby causing some leakage of the cooling fluid.

Current systems such as that described in U.S. Pat. Nos. 5,647,114 and 4,828,479 to Pleasant ('114 and '479 patents) provide a circulation channel for fluid to cool or heat an injection mold assembly. However, fluid must be drawn out of the apparatus before the molds are changed. This delay slows down the production cycle of current molding systems which routinely swap various molds according to production needs.

Consequently, there is a need in the art for a water jacket apparatus which maintains the fluid barrier during mold changes, yet provides the requisite thermal regulating abilities for injection mold systems.

There is a further need in the art for a mold interface which provides a secure fluid inlet and outlet channels for fluid circulation within the mold itself.

SUMMARY OF THE INVENTION

The present invention solves significant problems in the art by providing a water jacket apparatus which does not require the fluid circulating around the perimeter of the mold to be drained when a mold is changed. The water jacket is preferably constructed of an oxidation-resistant material which has good heat conducting properties, such as AMPCO 940, a copper-beryllium alloy.

The water jacket comprises a sleeve dimensioned to receive a mold within the inside perimeter of the sleeve. The inside perimeter of the sleeve and the outside perimeter of the mold are designed to fit flush to provide the maximum amount of surface area contact. A conduit is beveled into the outside perimeter of the sleeve forming a circulation channel through which fluid, usually water, flows to either cool or heat the apparatus. The water jacket is rigidly fixed to a mold base through which a sleeve fluid duct provides a channel to transfer fluid to the circulation channel in the sleeve. Fluid-impermeable gaskets are sandwiched on either side of the circulation channel to prevent leakage of fluid into the mold base. One or more mold fluid ducts are provided in the mold base to circulate fluid throughout the mold itself.

It is also preferable to have a separate fluid circulation system directed to the actual mold inserted within the sleeve. This may be accomplished using a fluid input plug and fluid output plug extending from the mold base inside the perimeter of the sleeve. Rather than using 0-ring gaskets which may fail to seal if the mold is not completely secured within the base, resilient, tapered plugs are received by opposing apertures in each mold to provide fluid circulation. In a preferred embodiment, the plugs are located towards the top of the mold base so that during changeovers, a minimal amount of fluid drains from the internal molds fluid channels when separated from the plugs.

Accordingly, it is an object of the present invention to provide an apparatus that permits operators of injection mold systems to quickly change one or more molds without requiring the operator to drain fluid from the fluid circulation channel surrounding the mold.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
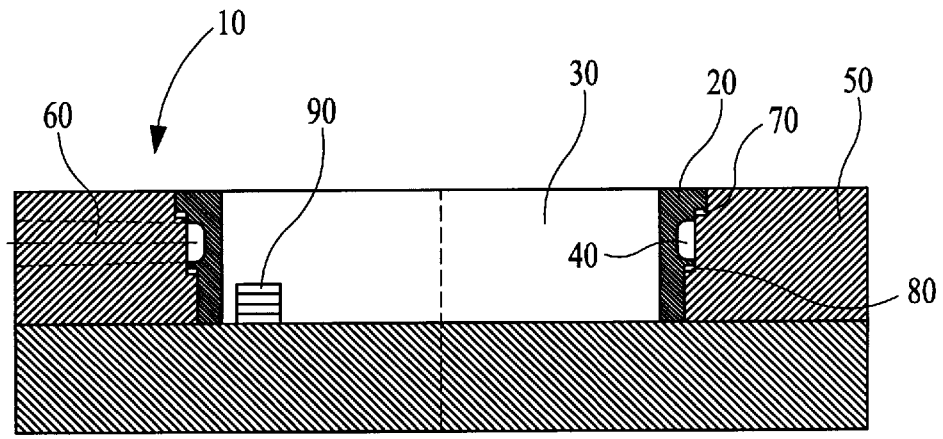
FIG. 1 is a cross-sectional side view of a preferred embodiment of the water jacket apparatus according to the invention

Referring initially to FIG. 1 of the drawings, in which like numerals indicate like elements throughout the several views, the mold assembly is designated as a whole by the numeral 10. In a preferred embodiment a mold base 50 slideably receives a sleeve 20. The preferred material for construction of the sleeve is a copper-beryllium alloy such as AMPCO 940. A conduit 40 beveled into the outside perimeter of the sleeve forms a circulation channel around the sleeve 20. The inner perimeter of the sleeve is dimensioned to slideably receive a mold 30. At least one or more sleeve fluid ducts 60 in the mold base 50 align with the conduit 40 of the sleeve 20 when the sleeve 20 is received within the mold base 50. Above and below the conduit 40 an upper shoulder 70 and a lower shoulder 80 sandwich a resilient, fluid impermeable barrier between the sleeve 20 and the mold base 50. In a preferred embodiment, one or more resilient mold fluid plugs 90 extend from the mold base 50 within the inner circumference of the sleeve 20. The mold fluid plugs 90 are preferably tapered, having a larger circumference proximate to the mold base 50 while a lesser circumference distal to the mold base 50. Multiple annular shoulders in the mold fluid plugs 90 provide a tight seal when the mold fluid plugs 90 are received within fluid duct openings in the mold 30.

Figure 2:
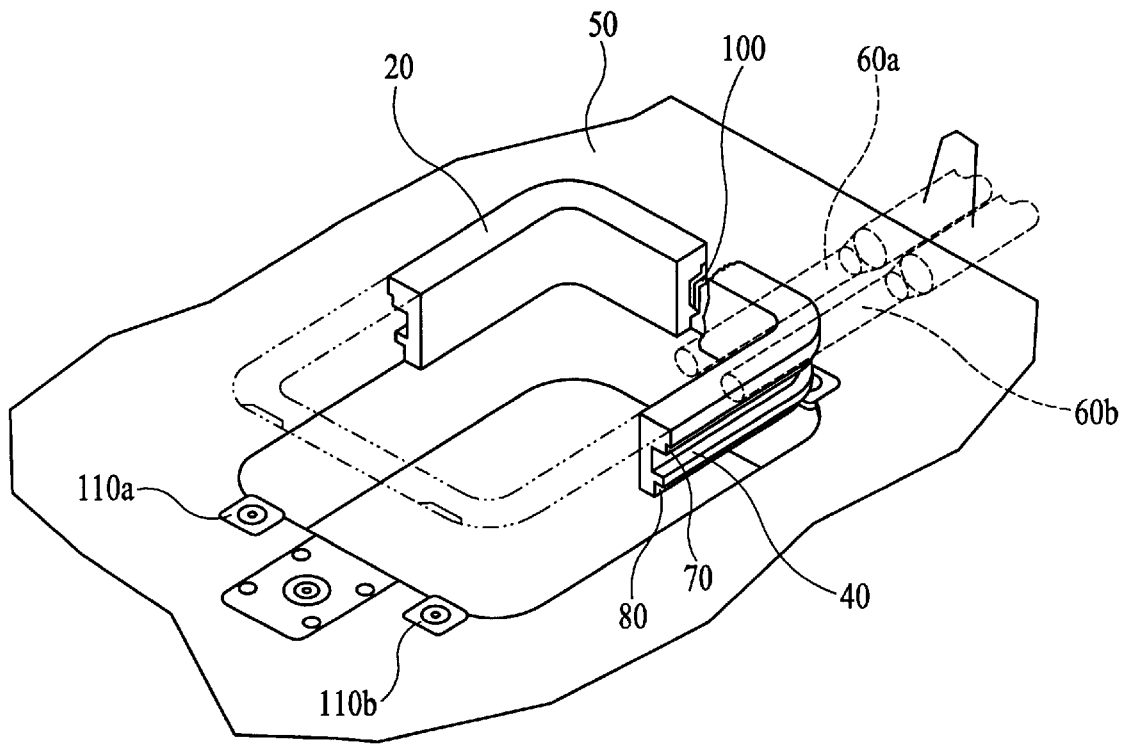
FIG. 2 is an exploded perspective view of a preferred embodiment of the water jacket apparatus according to the invention.

FIG. 2 illustrates a plurality of sleeve fluid ducts 60*a–b* which provide fluid to the sleeve 20. In a preferred embodiment, a water baffle 100 directs the incoming and outgoing fluid in a consistent direction to reduce hydrodynamic turbulence. The sleeve 20 is rigidly secured to the mold base 50 using a screw-type fastener assembly 110*a–b*.

In the operation of the sleeve, a cooling fluid, generally water, passes through a first sleeve fluid duct 60*a* in the mold base 50 into the conduit 40. The fluid circulates around the perimeter of the sleeve 20, transferring thermal energy from the sleeve 20 to the fluid. The fluid then exits the sleeve 20 through a second sleeve fluid duct 60*b* within the mold base 50. The cooling of the sleeve 20 effectively cools the mold 30. Conversely, should heating of the mold be required, the fluid hotter than the ambient temperature of the apparatus is circulated throughout the sleeve 20.

Accordingly, it will be understood that the preferred embodiment of the present invention has been disclosed by way of example and that other modifications and alterations may occur to those skilled in the art without departing from the scope and spirit of the appended claims.

What is claimed is:

1. A water jacket cooling apparatus comprising:
   a sleeve fashioned to receive a mold within the inside perimeter of said sleeve;
   a conduit beveled into the outside perimeter of said sleeve forming a circulation channel;
   a mold base dimensioned to slideably receive said sleeve;
   a resilient, fluid-impermeable barrier above and below said circulation channel, said barrier extending around the perimeter of said sleeve sandwiched by the engagement of said sleeve and said mold base;
   at least one or more fluid ducts in said mold base aligned with said conduit of said sleeve when said sleeve is inserted into said mold base;
   whereby said sleeve is slideably received into said mold base and fluid is circulated through said fluid ducts and around said circulation channel.

2. The water jacket apparatus described in claim 1 whereby the sleeve is constructed of a copper-beryllium alloy.

3. The water jacket apparatus described in claim 1 further comprising:
   a resilient fluid input plug extending from the mold base which is snugly received by a fluid intake aperture in the mold;
   a resilient fluid output plug extending from the mold base which is snugly received by a fluid exit aperture in the mold;
   whereby cooling fluid flows from the mold base, through the input plug and intake aperture, circulates through the mold, and exits through the exit aperture and output plug back into the mold base.

4. A water jacket cooling apparatus comprising:
   a sleeve fashioned to receive a mold within the inside perimeter of said sleeve;
   a conduit beveled into the outside perimeter of said sleeve forming a circulation channel;
   a mold base dimensioned to slideably receive said sleeve;
   a resilient, fluid-impermeable barrier on each side of said circulation channel around the perimeter of said sleeve sandwiched by the combination of said sleeve and said mold base;
   a first sleeve fluid duct aligned with said conduit and a second fluid duct aligned with said conduit;
   whereby cooling fluid flows through said first sleeve fluid duct into said conduit, cooling fluid circulates around the perimeter of said sleeve within said conduit and exits through said second fluid duct.

5. The water jacket apparatus described in claim 4 further comprising a water baffle secured within said conduit between said first sleeve fluid duct and said second sleeve fluid duct.

6. A water jacket cooling apparatus comprising:
   a copper-beryllium sleeve fashioned to receive a mold within the inside perimeter of said sleeve;
   a conduit beveled into the outside perimeter of said sleeve forming a circulation channel;
   a mold base dimensioned to slideably receive said sleeve;
   a resilient, fluid-impermeable barrier above and below said circulation channel, said barrier extending around the perimeter of said sleeve and sandwiched by the engagement of said sleeve and said mold base;
   a resilient fluid input plug extending from the mold base which is snugly received by a fluid intake aperture in the mold;
   a resilient fluid output plug extending from the mold base which is snugly received by a fluid exit aperture in the mold;
   a first sleeve fluid duct aligned with said conduit and a second fluid duct aligned with said conduit;
   whereby cooling fluid flows through said first sleeve fluid duct into said conduit, cooling fluid circulates around the perimeter of said sleeve within said conduit and exits through said second fluid duct and cooling fluid flows from the mold base, through the input plug and intake aperture, circulates through the mold, and exits through the exit aperture and output plug back into the mold base.

* * * * *